Figure 1:
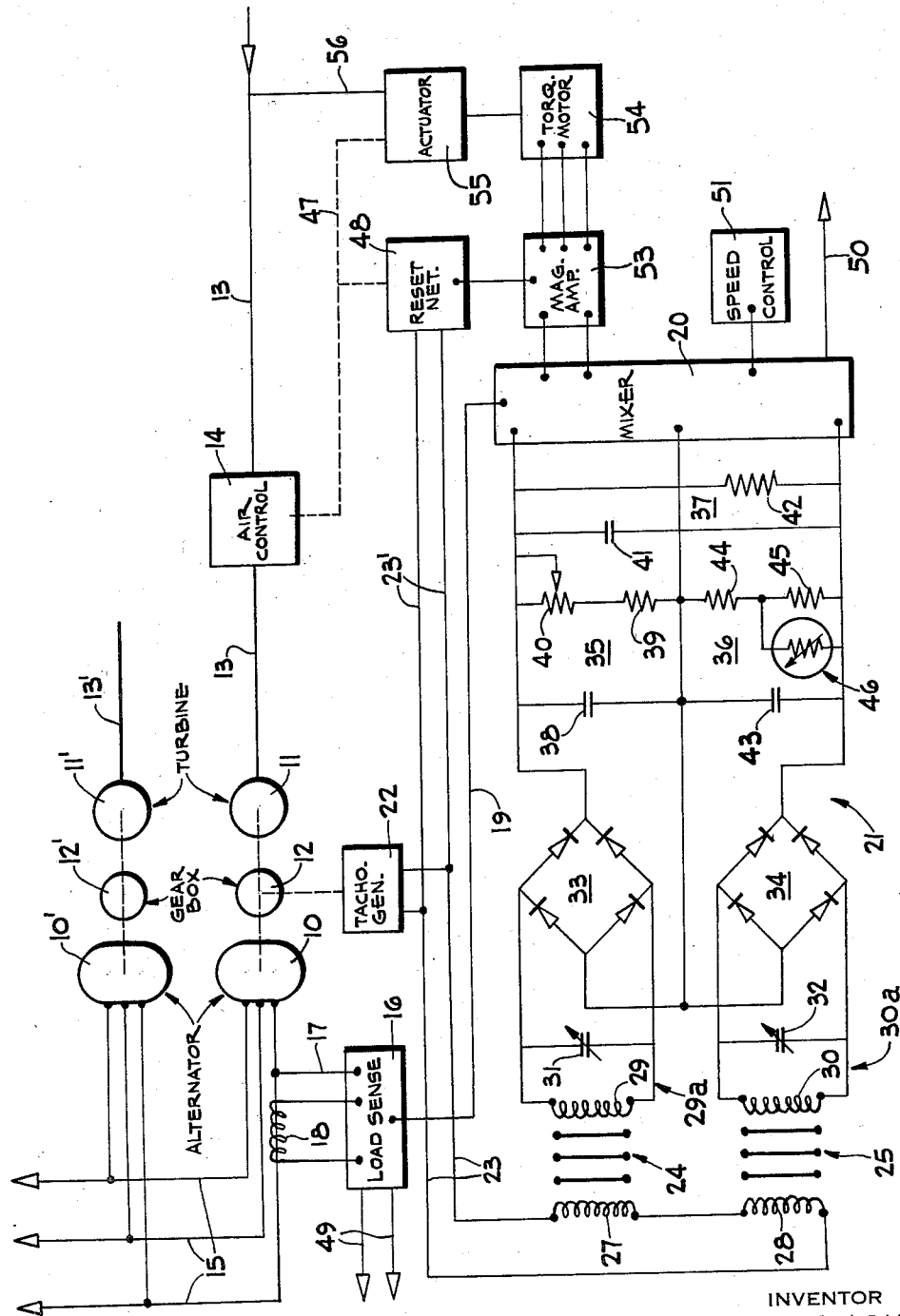

Dec. 2, 1958 K. SELDNER 2,863,067
ALTERNATED CONTROL SYSTEM WITH TEMPERATURE
COMPENSATED FREQUENCY DISCRIMINATOR
Filed Aug. 24, 1954 2 Sheets-Sheet 2

INVENTOR
KURT SELDNER
BY
ATTORNEYS 2,863,067
Patented Dec. 2, 1958

2,863,067

ALTERNATED CONTROL SYSTEM WITH TEMPERATURE COMPENSATED FREQUENCY DISCRIMINATOR

Kurt Seldner, Cleveland, Ohio, assignor to Thompson Products, Inc., Cleveland, Ohio, a corporation of Ohio Application August 24, 1954, Serial No. 451,928

6 Claims. (Cl. 307—88.5)

The present invention relates to temperature compensation in a frequency discriminator, and more particularly to a temperature compensated frequency discriminator in an alternator control system.

Opposing tuned circuit type frequency discriminators include therein a pair of tuned circuits such as tank circuits or the like which are tuned to frequencies substantially equally and oppositely different from the preselected frequency which is known as the set frequency or the null output frequency or simply as the null frequency. These systems may be so arranged that when the input signal varies from the null frequency of the null output frequency, the output from the system will have a sign and amplitude which is indicative of the magnitude of the frequency variation of the input from the preselected frequency and the direction of that variation. That is, where a frequency discriminator of the type described is set at a frequency, for example, 400 cycles, then when the input frequency to the frequency discriminator is greater than the present frequency, the output from the frequency discriminator will have a given sign and an amplitude which is indicative of the magnitude of the difference of the frequency of the input and the present frequency. Should the input frequency fall below the present frequency, however, then the output from the frequeny discriminator will have an opposite sign and an amplitude or a magnitude which is again indicative of the magnitude of the difference between the input frequency and the preselected frequency.

Frequency discriminators of this character have a very wide range of utility and are often used in sensing and control systems wherein their accuracy is important. Such an application of this type of frequency discriminator is exemplified in control systems for maintaining the output frequency of alternative or signal generators or the like substantially constant.

A specific example of an important utilization of this type of frequency discriminator is described in a co-pending application for United States Letters Patent by Walter R. Chapman and Stephen H. Fairweather, entitled "Control System for Turbine Driven Alternators," U. S. Serial No. 382,582, filed September 28, 1953, now Patent No. 2,763,897. In that application for patent there is described a control system for alternators such as airborne electric power systems wherein the alternator or alternators, which are preferably to be parallel interconnected, are driven by air turbines and the like and wherein it is important to maintain the frequency of the alternators substantially constant at a preselected frequency. The importance of maintaining the frequency of the alternator or alternators of an electric system for an aircraft substantially constant is emphasized by the fact that many of the instruments and electrical systems in an aircraft require a constant input frequency for accurate and reliable operation.

Since these aircraft systems are subject to widely varying temperature conditions, however, due to the varying climatic conditions and altitudes etc., in which the aircraft may be operated, it is important also that the control system for the alternators operate to maintain the alternator frequencies substantially constant independently of temperature variations.

Therefore, it is important that the alternator control system and frequency discriminator therein or other frequency sensing means therein be operative to remain set at the preselected frequency or null frequency or null output frequency substantially independent of temperature variations.

Frequency discriminators heretofore known, however, were subject to drift due to the varying characteristics of the elements comprising the frequency discriminators. When such frequency discriminators were used, therefore, the null output thereof occurred through a range of frequencies which varied with variations in temperature of the elements comprising the frequency discriminators.

By the present invention, however, this difficulty has been obviated and there is provided a frequency discriminator system which is so temperature compensated as to remain set at the preselected frequency or the preselected null output frequency or preselected null frequency substantially independent of temperature variations in the elements of the frequency discriminator.

It is, therefore, an important object of the present invention to provide a new and improved frequency discriminator system in which the preselected null frequency remains substantially constant, substantially independent of temperature variations surrounding the frequency discriminator and the elements thereof.

Another important object of the present invention is to provide a new and improved alternator control system with a temperature compensating frequency discriminator system so that the alternator control system may maintain the output frequency of the alternators substantially constant independently of temperature variations surrounding the system.

Still another important object of the present invention is to provide systems of the class described wherein a frequency discriminator has a pair of tuned tank circuits which are oppositely connected for a null output at a preselected frequency and which has an output network connected thereacross in which output network means is provided to compensate for variations in the characteristics of the elements of the frequency discriminator temperature variations whereby the null output frequency of the frequency discriminator remains substantially constant, substantially independent of temperature variations.

Yet another object of the present invention is to provide a new and improved temperature compensated frequency discriminator having a pair of oppositely connected tuned circuits and a thermistor loading one of said tuned circuits whereby the null output frequency of the frequency discriminators maintain substantially constant, substantially independent of temperature variations.

Yet another object of the present invention is to provide a new and improved frequency discriminator system wherein a pair of oppositely connected tuned circuits are tuned to frequencies equally and oppositely different from the preselected null output frequency of the frequency discriminator and wherein a thermistor is connected to load the tank circuit which is tuned to the higher frequency whereby the null output frequency of the frequency discriminator is maintained substantially constant, substantially independent of temperature variations.

Figure 3:
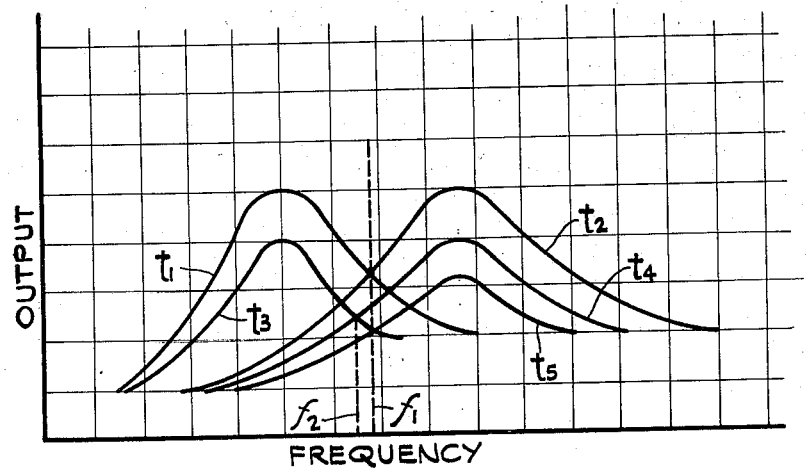
Figure 2:
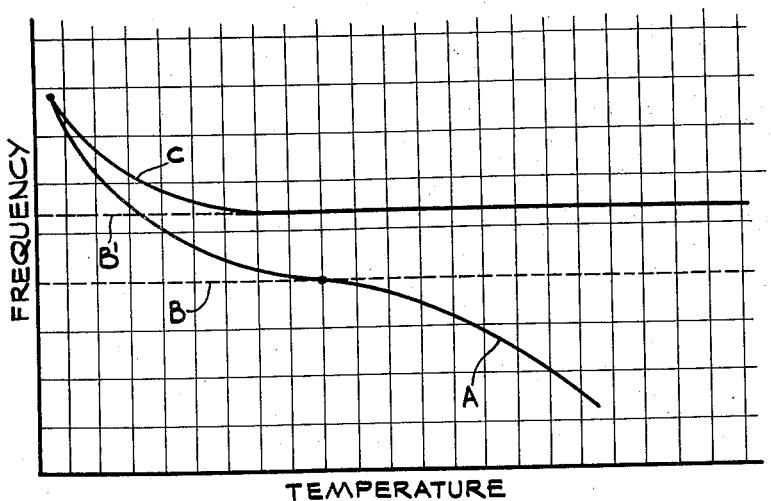

Still other objects, features and advantages of the present invention will become evident to those skilled in the art, and others, from the following detailed description of the principles of the present invention and an embodiment thereof, from the claims, and from the accompanying drawings, in which each and every detail shown is fully and completely disclosed as a part of this specification, in which like reference numerals refer to like parts, and in which:

Figure 1 is a more or less schematic diagram of an alternator control system embodying the principles of the present invention;

Figure 2 is a comparison chart indicating the temperature versus frequency characteristics of a frequency discriminator without temperature compensation and the same frequency discriminator with temperature compensation in accordance with the principles of the present invention; and Figure 3 is a diagrammatic graphic illustration of output versus frequency for the individual tuned circuits of the frequency discriminator with and without temperature compensation in accordance with the principles of the present invention.

As shown on the drawings:

There is illustrated in Figure 1, an alternator control system embodying many of the characteristics of the alternator control system which is described in the above copending application for patent by Walter R. Chapman and Stephen H. Fairweather. In the alternator control system illustrated in Figure 1, an alternator 10, is driven by a pneumatic turbine 11 or the like which is coupled thereto through a gear box 12 or the like. Fluid such as a pneumatic fluid is supplied to the turbine from a source thereof, not shown, through a fluid line or pipe or tube 13 having a control unit 14 therein. This air control, in the case of an air driven alternator or pneumatic turbine system, is operative to control the air pressure and flow rate to the turbine thereby controlling the speed and torque and power supplied to the alternator and more particularly to the turbine 11 driving the same.

The air control unit 14 is itself controlled in such a manner that the output frequency of the alternator 10 is maintained substantially constant and so that there is substantially equal load division between the alternator 10 and an alternator 10' which is connected in parallel therewith and two bus bars 15 or the like which distribute power to the various devices which are electrically operated in the aircraft or the like. The alternator 10', like the alternator 10, is driven by a turbine 11' to which it is connected through a gear box 12' and the turbine 11' is supplied with power through an air line 13' in which the flow rate and pneumatic pressure and the like are controlled by a system which is substantially identical to the system which controls the supply of air to the turbine 11.

Although the system has been illustrated as having two alternators 10 and 10', any number of such alternators may be connected to the distribution lines 15 and when all of the alternators are controlled by systems such as the systems controlling the alternator 10, the load will be substantially equally divided therebetween and the output frequencies of the alternators will be maintained substantially constant.

The system for controlling the alternator 10 includes a load sensing network 16 which is coupled to one of the output leads of the alternator 10 by a potential sensing lead 17 and a current transformer 18 or the like. The output from the load sensing network 16 is fed through a lead 19 to a mixer network 20 to provide the mixer 20 with a signal which is indicative of the load on the individual alternator 10. The mixer network mixes with this load sensing signal, a frequency sensing signal from a frequency discriminating network indicated generally at 21 and which is supplied with a signal having a frequency substantially the same as the output frequency of the alternator 10. This input signal to the frequency discriminator network 21 is provided from a tachometer generator 22 or the like. The tachometer generator 22 is driven directly from the gear box 12 so that its speed and frequency is either the same as or directly proportional to the speed and frequency of the alternator 10.

The output signal from the tachometer generator 22 is fed to the frequency discriminator network 21 through a pair of leads 23 which may be connected through a voltage transformer or directly to a pair of frequency discriminators input transformers 24 and 25, and more specifically to the primary windings 27 and 28 of the transformers 24 and 25 respectively. The secondary windings 29 and 30 of the transformers 24 and 25 respectively each form a part of an input tuned tank circuit since each is connected in parallel with the capacitances 31 and 32 respectively. These tuned tank circuits are tuned to frequencies substantially equally and oppositely from the preselected frequency for the output of the tachometer generator 22 and the alternator 10. More specifically, these tank circuits are so tuned that when they are connected in opposition, the combined output therefrom will have a null value when the input to the frequency discriminator through the input primaries 27 and 28 is equal to the proper preselected frequency for the tachometer generator 22 and the alternator 10.

Rectifiers or the like such as the full wave rectifier bridges 33 and 34 are connected across the outputs from the secondaries 29 and 30 and from the tuned tank circuits and are connected together in opposition to provide the described output for the frequency discriminator network 21. There is further provided, however, filter networks across the combined output of the rectifiers 33 and 34 and further across each of the rectifiers 33 and 34 to smooth the outputs therefrom so that the output signal to the mixer 20 from the frequency discriminator 21 will be a D. C. output which will have a sign and amplitude indicative of the direction and magnitude of the frequency variation from the preselected null output frequency of the frequency discriminator. These filter networks include R-C networks such as the networks 35 and 36 which are connected across the rectifiers 33 and 34 respectively and the network 37 which is connected across the combined output of the rectifiers 33 and 34.

The filter network 35 includes a capacitor 38 and a resistance 39 which is connected in series with an adjustable or variable resistance or rheostat 40. This series resistance network is connected as shown in Figure 1, in parallel with the capacitor 38 and across the rectifier bridge 33.

The combined output filter 37 includes a capacitor 41 and a parallel resistance 42 which are connected across the combined output of the rectifier bridges 33 and 34. The filter network 36, however, in addition to having a capacitance 43 and a parallel resistance 44 has a resistor 45 connected in series with the resistance 44 and in parallel with a thermistor 46.

It has been found, in accordance with the principles of the present invention, that many of the elements of the frequency discriminator network 21 have such varying characteristics under varying temperature conditions that the null output frequency of the frequency discriminator will shift when temperature of these elements varies. More particularly, it has been found that the null output frequency of the frequency discriminator network 21 will shift to a lower frequency as the temperature rises. This decrease in the null output frequency of uncompensated frequency discriminator, with a rise in temperature, is graphically illustrated by the curve A in Figure 2, wherein the temperature versus frequency characteristic of frequency discriminator of this character is plotted and the desired preselected null output frequency is indicated by the dash line B.

With the thermistor 46 or other elements having a negative temperature coefficient of resistance included in the system incorporating the principles of the present invention, such as in the manner described, the frequency discriminator network 21 will have a temperature versus frequency characteristic such as that graphically illustrated at C in Figure 2. By comparing curves A and C it will be readily observed that while the curve A which illustrates the characteristics of an uncompensated frequency discriminator has a continuously reducing null output frequency as temperature increases, a compensated frequency discriminator network has a temperature versus frequency characteristic which levels off to a constant null output frequency. The null output frequency may be maintained substantially constant at a value such as indicated by the broken line B or any other desired value such as that indicated by the broken line B' as desired. The frequency which is maintained substantially constant, substantially independent of temperature, may be determined by selection of appropriate values for the thermistor 46 or by causing the the thermistor 46 to be adjustably variable to various preset conditions.

Considering the various network parts of the frequency discriminator 21 separately, there is shown in Figure 3 a comparative study of the tuned circuits and the outputs therefrom. In Figure 3 it may be seen that at the temperature which the tanks are tuned, the frequency versus output characteristics thereof will be such that tank circuit 29a will have a responsive curve $t_1$ and the tank circuit 30a will have a response curve $t_2$. These curves, $t_1$ and $t_2$ will cross or have the same magnitude at a frequency indicated by the broken line $f_1$ which is the null otuput frequency for a frequency discriminator of the character described since the tanks are connected together with their outputs in opposition. That is, at this crossing point for the curves $t_1$ and $t_2$ the magnitudes of the curves are equal and the null output frequency is thus found as indicated by the broken line $f_1$ since the outputs of the tuned circuits are in opposition.

If the frequency discriminator is not compensated for temperature variations, in accordance with the principles of the present invention, however, when the temperatures rise the elements of the frequency discriminator will have the characteristics thereof vary in such a manner that the response curves corresponding to the curves $t_1$ and $t_2$ respectively are illustrated by the curves $t_3$ and $t_4$. The curves $t_3$ and $t_4$ do not, however, cross at the frequency $f_1$, but they cross at a lower frequency $f_2$ even though the tuned circuits remain tuned to frequencies which are substantially equally and oppositely different from the preselected null output frequency $f_1$. This variation of the null output frequency of the frequency discriminator from the preselected null output frequency is due to the particular characteristics of the curve as they change due to variation of the characteristics of the elements with temperature changes.

It is understood, of course that the curves $t$, $t_3$ have a sign opposite to the sign of the curves $t_2$, $t_4$ and $t_5$ but that they have been illustrated here as all having the same sign in order to better illustrate conditions of equal magnitude etc.

When a circuit element with a negative temperature coefficient of resistance such as the thermistor 46 is connected into the circuit in accordance with the principles of the present invention, and the temperature conditions are shifted from the tuned conditions to the conditions which resulted in output curves $t_3$ and $t_4$, then the output from the tuned circuit 30a will have a characteristic such as that indicated at $t_5$.

By placing this temperature compensation loading element in circuitry with the upper frequency tuned network, the upper response curve will be so lowered that it will intersect the response curve for the lower tuned circuit at the preselected null frequency $f_1$ and thereby maintain the null output frequency of the frequency discriminator substantially constant, substantially independent of the temperature change.

That is, by loading the upper frequency tuned circuit with an element such as the resistor element, the resistance of which decreases with an increase in temperature, the preselected null frequency of the frequency discriminator may be maintained substantially constant independently of temperature even though the characteristics of the remaining elements of frequency discriminator may vary with temperature in such a manner that the null output frequency of the frequency discriminator would vary from the preselected value therefore when the temperature compensation means is omitted from the frequency discriminator.

Thus it will be seen that the output from the frequency discriminator network 21 to the mixer 20 truly has a sign and amplitude which is an accurate indication of the direction and magnitude of the variation of the frequency of the tachometer generator and the alternator 10 from the preselected frequency therefor. The output from the mixer circuit 20 is fed to a magnetic amplifier 53 which controls the energization of a torque motor 54 or the like and which in turn controls the movement of a pneumatic actuator 55 having a pneumatic supply connection 56 to the main air supply line 13 and having a controlling mechanical connection, as indicated by the broken line 47, with the air control unit 14 to control the air flow through the supply line 13 to the turbine 11. A reset network 48 is also connected to the mechanical coupling 47 so that the output therefrom which is supplied to the magnetic amplifier 53 varies with the control variation of the output of the actuator 55 and thus provides a supplementary signal to the magnetic amplifier 53 which compensates for the tendency of the system to reach a stabilized level of power and speed which is below the proper power and speed for the alternator 10. The reset network is energized by connection through lines 23' to the output of the tachometer generator 22.

Since the alternator 10' is similarly controlled, both of the alternators or all of the alternators of the system, will operate at a substantially constant frequency and will have the load on the distribution buses or lines 15 substantially equally divided therebetween.

To insure such an equal load division between the alternators, however, means may be provided to interconnect the systems such as by interconnecting the load sensing networks 16 through load division leads 49 or by interconnecting the mixer networks 20 through load division leads 50 in accordance with the principles described in other co-pending applications for patent.

It should also be noted that when an alternator such as an alternator 10 is to be connected on to the distribution leads 15 while other alternators such as the alternator 10' are already connected to the distribution leads 15 and supplying power to loads thereon, the speed of the alternator 10 should be decreased in accordance with well known principles whether the alternators have a natural group characteristic or a manufactured group characteristic.

To permit manual control of the speed of the alternator 10, such as for purposes described, an additional signal may be supplied to the mixer circuit 20 from a speed control 51 which may be manually controllable or which may be provided as part of an automatic starting system or as part of an automatic paralleling system.

From the foregoing it will most certainly be observed that in accordance with the principles of the present invention, there is provided an alternating control system which is operative to maintain the output frequency of the alternator substantially constant independently of temperature variations in the control system and that there is further provided a frequency discriminator network for such a control system which will have a null output frequency which will be maintained substantially constant substantially independent of temperature variations.

It will also be observed that numerous variations and modifications may be made without departing from the true spirit and scope of the novel concepts of the principles of this invention. I, therefore, intend to cover all such modifications and variations as fall within the true spirit and scope of the novel concepts and principles of this invention.

I claim as my invention:

1. In combination in a frequency discriminator network wherein a pair of tuned tank circuits are respectively tuned to frequencies substantially equally and oppositely different from a preselected null frequency and wherein elements of each of said tuned tank circuits vary with temperature changes, rectifier means connected across said tank circuits to derive a direct current output signal from said tank circuits, circuit element means connected to only one of said tuned tank circuits to compensate for temperature change variations and to maintain the preselected frequency of the frequency discriminator substantially constant.

2. In combination in a frequency discriminator network wherein a pair of tuned tank circuits are respectively tuned to frequencies substantially equally and oppositely different from a preselected null frequency, and wherein elements of each of said tuned tank circuits have characteristics which vary with temperature variations, rectifier means connected across said tank circuits to derive a direct current output signal from said tank circuits, circuit element means including an element having a negative temperature coefficient of resistance connected across one of said tuned tank circuits to compensate for temperature change variations in the characteristics of said elements and to maintain the preselected null frequency of the frequency discriminator substantially constant.

3. A temperature compensated frequency discriminator system comprising a pair of interconnected tuned tank circuits to receive an alternating current input of a frequency variable from a preselected frequency, said tank circuits being tuned respectively to frequencies substantially equally and oppositely different from a preselected frequency, rectifier means connected across said tank circuits to provide a direct current output signal proportional to the deviation of the frequency of said alternating current input signal from said preselected frequency, circuit elements in said tank circuits operative to modify the characteristics thereof under varying temperature conditions whereby the frequency discriminator will have a null output frequency different from the preselected frequency under differing temperature condition, and means in only one of said tank circuits having a negative temperature coefficient of resistance to substantially compensate for changes in said circuit elements with temperature whereby the null output frequency of the frequency discriminator will remain substantially constant and substantially equal to the preselected frequency substantially independent of temperature variations.

4. A temperature compensated frequency discriminator system operative to have a null output at a preselected frequency comprising a pair of tuned tank circuits respectively tuned to frequencies substantially equally and oppositely different from the preselected null output frequency, a pair of rectifier circuits respectively connected across the output of the tuned tank circuits, means interconnecting said rectifier circuits together, and resistance-capacitance filter networks connected across said rectifier circuits and connected together, and a resistance element having a negative temperature coefficient of resistance connected in only one of said filter networks to maintain the null output frequency of the frequency discriminators substantially constant and substantially equal to the preselected frequency substantially independent of temperature changes.

5. A temperature compensated frequency discriminator system operative to have a null output at a preselected frequency comprising a pair of tuned tank circuits respectively tuned to frequencies substantially equally and oppositely different from the preselected null output frequency, a pair of full wave rectifiers respectively connected across the output of the tuned tank circuits, means interconnecting said full wave rectifiers together, and resistance-capacitance filter networks connected across each of said rectifiers respectively and connected together, and a resistance element having a negative temperature coefficient of resistance connected in only one of said filter networks to maintain the null output frequency of the frequency discriminators substantially constant and substantially equal to the preselected frequency substantially independent of temperature changes.

6. A temperature compensated frequency discriminator system operative to have a null output at a preselected frequency comprising a pair of tuned tank circuits respectively tuned to frequencies substantially equally and oppositely different from the preselected null output frequency, a pair of full wave rectifiers respectively connected across the output of the tuned tank circuits, means interconnecting said full wave rectifiers together, in opposition and parallel resistance-capacitance filter networks connected across each of said full wave rectifiers respectively and connected together in opposition, and a resistance element having a negative temperature coefficient of resistance connected in parallel in only one of said filter networks to maintain the null output frequency of the frequency discriminators substantially constant and substantially equal to the preselected frequency substantially independent of temperature changes.

References Cited in the file of this patent

UNITED STATES PATENTS

| | | |
|---|---|---|
| 2,128,649 | Kinross et al. | Aug. 30, 1938 |
| 2,572,424 | Amos | Oct. 23, 1951 |
| 2,611,031 | Appert | Sept. 16, 1952 |
| 2,623,177 | Hugenholtz | Dec. 23, 1952 |
| 2,654,032 | Staschover et al. | Sept. 23, 1953 |
| 2,679,588 | Henry | May 25, 1954 |
| 2,710,368 | Wylie et al. | June 7, 1955 |
| 2,751,549 | Chase | June 19, 1956 |
| 2,751,550 | Chase | June 19, 1956 |

OTHER REFERENCES

Philco Service Bulletin, Philco Telev. Receiver, Model 48–1001, codes 121, 122 (supplemental PR–1542); First and second page.